May 29, 1923.
H. H. VICKERS
COMPUTING MACHINE
Filed March 10, 1921
1,456,660
Fig. 1.
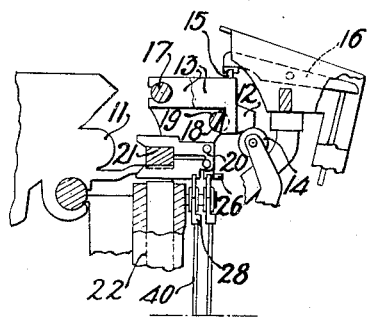
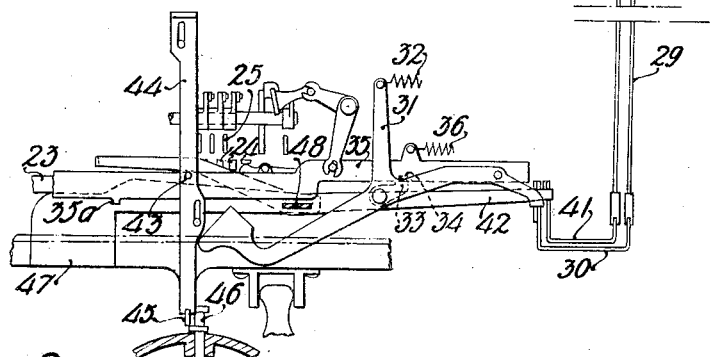
Fig. 2.
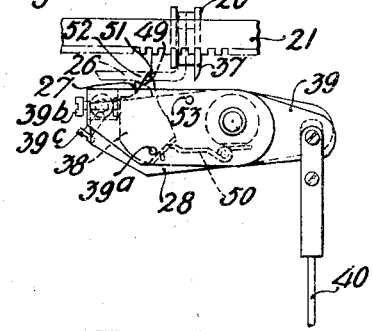
Fig. 3.
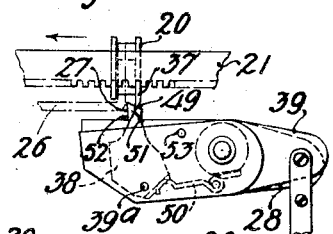
Fig. 4.
Fig. 5.
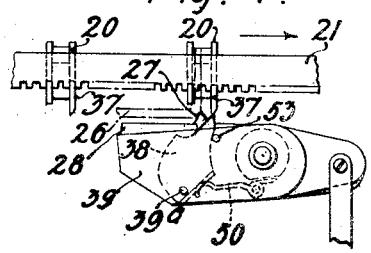
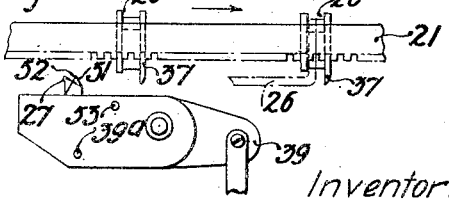
Inventor:
Harry H. Vickers
by C. C. Stickney
Attorney Patented May 29, 1923.

1,456,660

UNITED STATES PATENT OFFICE.

HARRY H. VICKERS, OF CORONA, LONG ISLAND, NEW YORK, ASSIGNOR TO UNDERWOOD COMPUTING MACHINE COMPANY, OF NEW YORK, N. Y., A CORPORATION OF NEW YORK.

COMPUTING MACHINE.

Application filed March 10, 1921. Serial No. 451,120.

*To all whom it may concern:*

Be it known that I, HARRY H. VICKERS, a citizen of the United States, residing in Corona, Long Island, in the county of Queens and State of New York, have invented certain new and useful Improvements in Computing Machines, of which the following is a specification.

This invention relates to means for automatically restoring a computing machine to the state of addition when the carriage is backed into an addition zone when set for subtraction, thus eliminating the possibility of performing an operation of subtraction in an addition zone, due to failure of the operator to restore the machine to addition, and is in the nature of an improvement on the application of Wendell P. Keene, Serial No. 420,339, filed October 29, 1920.

According to the present invention, the resetting of the machine to addition is effected by very simple means, economical to manufacture and involving very slight changes in the mechanism of the machines in common use.

In the bookkeeping machines of the Underwood-Hanson type now in use, upon movement of the carriage out of a computing zone, a suitably positioned tabulator-stop rides over and cams downwardly a dog on a motor-trip lever, thereby shifting the latter and causing actuation of the general operator. The dog on the motor-trip lever is usually mounted so as to yield when engaged by the tabulator-stop during a return movement of the carriage, so that actuation of the general operator will not occur as a result of such return movement.

In carrying out the present invention, the pivoted dog on the operating lever is provided with two cam-faces to enable a camming action to be effected by a tabulator-stop when the carriage is moved in either direction, and suitable provision is made to limit the movement of the pivoted dog with reference to the lever when the dog is engaged by the tabulator-stop in the return movement of the carriage. In order not to interfere with the return of the motor-trip lever to normal after the tabulator-stop leaves the highest point of the dog during the letter-feeding movement of the carriage, the cam-surface, which is engaged in the return movement, has a rather steep inclination for camming purposes, but, due to the fact that the dog is pivoted and yieldably held in its normal position, it may be swung, when engaged by the tabulator-stop during the return movement of the carriage, to a limiting position where the cam-face is brought to a suitable camming angle. The tabulator-stop will then ride over the dog and rock the motor-trip lever to cause actuation of the general operator and resetting of the mechanism to the state of addition It should be understood that the manner in which the computing machine is set for subtraction is unimportant, and that the matter of greatest importance is to reset the machine to addition, when it is set for subtraction, by backing it into an addition zone.

Other features and advantages will hereinafter appear.

In the accompanying drawings,

Figure 1 is a fragmentary side view of an Underwood-Hanson bookkeeping machine with my invention applied thereto.

Figure 2 is a detail view, showing the novel form of dog on the motor-trip lever.

Figure 3 is a detail view, showing the motor-trip lever actuated by a tabulator-stop in the letter-feeding movement of the carriage.

Figure 4 is a view similar to Figure 3, but showing the parts in the position assumed when the motor-trip lever is actuated by a tabulator-stop during a return movement of the carriage.

Figure 5 is a view showing the position of the parts when the carriage has been backed from a subtraction zone into an addition zone.

Upon movement of the carriage 11 into a computing zone, a frusto-conical roll 12 on a denomination-selector 13 will ride up the tapered end of a roller, or zone-controller 14, and raise a selector-dog 15 into position to actuate denominational jacks 16 seriatim as the carriage is fed through the computing zone as a result of successive actuations of the numeral-keys, not shown. The denomination-selector 13 is mounted for swinging movement about a rod 17, and may be set at different positions therealong by means of a tooth 18 on the selector, which may engage in notches in another rod 19. The movement of the carriage 11 into the computing zone may be effected in any suitable manner, as, for example, by tabulating mechanism such as that disclosed in the patent to J. N. Thornton, 1,283,360, granted October 29, 1918. In positioning the carriage by such means, the final position of the carriage is determined by means of a tabulator-stop 20, mounted on a rack 21 supported by the carriage, coming into engagement with a lifted counter-stop 22.

Upon actuation of the jacks 16 by the selector-dog 15, the rack-bars 23 will be advanced seriatim into position to bring pins 24 thereon beneath the setting bars 25 to enable digits to be indexed by depression of the numeral-keys.

In case it is desired to perform subtraction in the computing zone, the tabulator-stop 20 may be provided with a cam-bar extension 26, which, upon movement of the carriage into the computing zone, will engage a finger or dog 27 pivoted upon a lever 28, thereby rocking the latter, and, by means of a link 29 and a bail 30, withdraw a latch from effective position and release a three-arm lever 31 to the action of a spring 32. Movement of the three-arm lever 31 in this manner will withdraw a latch 33 from engagement with a shoulder 34 on a subtraction-bar 35, and permit the latter to be drawn to the rear by means of a spring 36. Such movement of the subtraction-bar 35 will change the operative connections between the numeral-keys and the setting bars 25, and set all of the "9" pins on the pin-bars or rack-bars 23, as more fully brought out in said patent to Thornton.

Upon indexing for the units denomination, the carriage will move out of the computing zone, and a plate 37, forming part of the tabulator-stop 20, will engage a dog 38 pivoted on a motor-trip lever 39 at 39$^a$, thereby acting through a link 40 and a bail 41 to release a lever 42 to the action of a spring, not shown. The lever 42 will then be swung in a counter-clockwise direction, and, by engagement with a pin 43 on a slide 44, actuate the latter to rock a lever 45 and lift a motor-trip pin 46. Such movement of the pin 46 will throw into operation mechanism similar to that disclosed in the patent to Thornton and cause a complete reciprocation of the general operator 47.

During the forward stroke of the general operator a cross-bar 48 thereon will engage the depressed pins 24 on various rack-bars 23 and cause the totalizer-wheels, not shown, to be actuated in accordance with the pins depressed.

Usually the dogs or fingers 27 and 38 on levers 28 and 39, respectively, are provided with cam-surfaces, such as 49, on the dog 27, so that, in the letter-feeding movement of the carriage, the cam-bar 26 will act to cam down the dog 27, and the plate 37 will act to cam down the dog 38, and, in the return movement of the carriage, the bar 26 and the plate 37 will engage the corresponding dogs and move them back against suitable springs 50 so as to ride thereover without actuating either of the levers 28 or 39. As shown in Figure 2, the limiting position in which the dog 38 is held by its spring 50 is determined by an adjusting screw 39$^b$ and a clamping screw 39$^c$.

According to the present invention, provision is made to reset the machine for addition when the carriage is backed into an addition zone, in case the machine was previously set for subtraction. One manner in which such necessity for resetting may arise will be apparent in connection with the showing in Figure 5. In the movement of the carriage to the left, the left-hand tabulator-stop 20 would be brought into a position such that the corresponding selector 13 would determine an addition zone, and, upon movement of the carriage out of that zone, would cause automatic actuation of the general operator due to the engagement of the plate 37 with the right-hand cam-surface 51 of the dog 38, thereby causing the number indexed on the pins to be run into the computing wheels, not shown.

Upon further movement of the carriage into another computing zone, determined by another selector 13, suitably positioned with reference to the right-hand tabulator-stop 20 in Figure 5, the cam-bar 26 on the latter will engage the dog 27 on the subtraction-setting lever 28 and cause the machine to be set for subtraction. If the machine were now backed into the addition zone, the plate 37 of the left-hand tabulator-stop would, with the ordinary type of dog 38, merely turn the latter to the right against the action of its spring 50 and ride over the same without actuating the motor-trip lever.

According to the present invention, however, provision is made whereby the motor-trip lever will be actuated and the machine set for addition, due to the engagement of the bar 48 in its forward stroke with a lug 35$^a$ on the subtraction-bar 35, the latter being advanced by this means to position to be again engaged by the latch 33. To this end, the dog 38 is provided with a cam or cam-surface 52 at the left, as shown in Figure 5, and provision is made of a pin 53 to limit the movement of the dog to the right, so that the plate 37 of the tabulator-stop corresponding to the addition zone will ride up the cam-surface 52 and rock the lever 39 to trip the general operator and reset the machine for subtraction.

The cam-surface 52 is so designed that, during the movement of the carriage in the letter-feed direction, the operating lever 39 will be permitted to return to normal after the plate 37 of the tabulator-stop leaves the high point of the cam-surface 51. The cam-surface 52, consequently, has a rather steep inclination for camming purposes, but when the dog 38 is engaged by plate 37 of a tabulator-stop and swung to limiting position determined by pin 53, the cam-face 52 is brought to a suitable camming angle, as shown in Figure 4, and the lever 39 will be actuated.

In this connection, it should be understood that when the plate 37 of a stop 20 engages the dog 38 on the right, as shown in Figure 3, there is some leverage exerted independently of that due to the camming action of 37 on the cam-surface 51. When however, the carriage is backed into the zone this leverage would tend to oppose the actuation of lever 39 by engagement of plate 37 with cam-surface 52, and the camming action would be more difficult due to the fact that the high point of the dog 38 lies closer to the pivot 39$^a$ in Figure 4 than in Figure 3. As shown in Figure 3, however, the inclination of cam-face 52 becomes such, when the dog 38 contacts with pin 53, that no difficulty will arise in the actuation of lever 39 by the tabulator-stop.

Variations may be resorted to within the scope of the invention, and portions of the improvements may be used without others.

Having thus described my invention, I claim:

1. In combination, a traveling carriage, computing mechanism normally set for addition and including means for indexing numbers and a general operator for effecting computation of the numbers so indexed, subtraction-setting mechanism returnable to ineffective position by said general operator, and means for automatically causing actuation of said general operator upon letter-feeding movement of the carriage out of the computing zone and upon backing the carriage a predetermined distance into the computing zone.

2. In combination, a traveling carriage, computing mechanism normally set for addition and including means for indexing numbers and a general operator for effecting computation of the numbers so indexed, subtraction-setting mechanism returnable to ineffective position by said general operator, and means for automatically causing actuation of said general operator upon backing of the carriage a predetermined distance into a computing zone.

3. In combination, a traveling carriage, computing mechanism settable for addition or subtraction and including means for indexing numbers and a general operator for effecting a computation of the numbers so indexed, carriage-actuated means for determining computing zones, and means effective, upon backing the carriage a predetermined distance into an addition zone for changing the machine, if set for subtraction, to a setting for addition.

4. In combination, a traveling carriage, computing mechanism settable for addition or subtraction and including means for indexing numbers and a general operator for effecting computation of the numbers so indexed, carriage-actuated means for determining computing zones for addition or subtraction, and means effective upon backing the carriage a predetermined distance into a zone for one state of computation, for resetting the machine, if set for the other state of computation to the state for computation in that zone.

5. In combination, a traveling carriage, computing mechanism including means for indexing numbers and a general operator for effecting computation of the numbers so indexed, means for determining computing zones for said carriage, and means effective, upon passage of the carriage through an addition zone, for automatically throwing the general operator into operation as the carriage passes out of the zone, and upon passing through a subtraction zone, for setting the computing mechanism for subtraction as the carriage enters the zone, and for throwing the general operator into operation as the carriage passes out of the zone, said last-mentioned means being effective upon backing of the carriage into zones of both kinds to throw the general operator into action but ineffective for subtraction setting.

6. In combination, a traveling carriage, computing mechanism, and means whereby said computing mechanism is automatically controlled by the carriage, comprising a member mounted on the carriage for movement therewith, an operating lever, a dog pivotally mounted on said lever and normally lying in the path of said member, said dog having a cam-surface to be engaged by said member during letter-feeding movement of the carriage to enable depression of the dog for actuation of the operating lever, and a cam-surface on the other side thereof of such inclination as not to interfere with the return movement of the dog when the member is carried off the high point of the cam during letter-feeding movement of the carriage, spring means yieldably holding said dog in effective position but adapted to yield upon engagement of the dog by the member during the return movement of the carriage, and means to limit the movement of the dog, so that the cam-surface engaged by the member during the return movement of the carriage will assume a proper camming inclination to facilitate depression of the dog and consequent rocking of the operating lever.

7. In combination, a traveling carriage, computing mechanism normally set for addition and including means for indexing numbers, and a general operator for effecting computation of the numbers so indexed, subtraction-setting means returnable to ineffective position by said general operator, and means for automatically throwing said general operator into action as the carriage passes out of a computing zone in a letter-feeding direction, or is backed a predetermined distance into said zone, comprising a member on the carriage, an actuating lever, a dog pivoted on said lever and extending into the path of said member, and means to limit the movement of said dog in opposite directions, said dog having inclined faces meeting at a common point, the inclination of such faces and the limiting positions of the dog being such that the dog, when engaged by said member due to movement of the carriage in either direction, will be positioned so that the face engaged by the member will have a proper inclination for camming purposes, and the other inclined face will be positioned so as to prevent delay in return of the lever to normal position after the member has passed the high point of the dog formed by the two inclined faces.

8. In combination, a traveling carriage, computing mechanism normally set for addition, carriage-actuated means for determining computing zones, subtraction-setting means, means for restoring said subtraction-setting means to ineffective condition, and means rendered effective upon backing the carriage a predetermined distance into a computing zone, for actuating said restoring means to be actuated.

9. In combination, a traveling carriage, computing mechanism normally set for addition and including means for indexing numbers and a general operator for effecting computation of the numbers so indexed, subtraction-setting means returnable to ineffective position by said general operator, and means for automatically throwing said general operator into action as the carriage passes out of a computing zone in a letter-feeding direction, or is backed a predetermined distance into said zone, comprising a member on the carriage, an actuating lever, a dog pivoted on said lever and extending into the path of said member, means to limit the movement of said dog in opposite directions, said dog having inclined faces meeting at a common point, the inclination of such faces and the limiting positions of the dog being such that the dog, when engaged by said member due to movement of the carriage in either directions, will be positioned so that the face engaged by the member will have a proper inclination for camming purposes, and the other inclined face will be positioned so as to prevent delay in return of the lever to normal position after the member has passed the high point of the dog formed by the two inclined faces, and means for normally urging said dog into position to which one of the inclined faces has the proper inclination to enable the dog to be actuated by said member when moved in a letter-feed direction.

10. In combination, a traveling carriage, computing mechanism normally set for addition and including means for indexing numbers and a general operator for effecting computation of the numbers so indexed, subtraction-setting mechanism, means including tabulator-stops for positioning the carriage in different computing zones, and means actuable by the tabulator-stop for any zone, when the carriage is backed a predetermined distance into the latter, for restoring the subtraction-setting mechanism to ineffective position.

11. In a combined typewriting and computing machine, in combination, a traveling carriage, register-controlling mechanism in which a number is indexed digit by digit in accordance with numeral-keys depressed and then run into the register, said register-controlling mechanism being normally set for addition, subtraction-setting mechanism, and means actuable by the carriage in a letter-feeding direction to run the number so indexed into the register and in a movement in the opposite direction to reset the register-controlling mechanism to addition if previously set for subtraction.

12. In a combined typewriting and computing machine, the combination with a traveling carriage, of computing mechanism, a motor for actuating said computing mechanism for different purposes, a motor-trip to control the starting of said motor, and a motor-trip actuator, said motor-trip comprising a lever pivotally mounted adjacent the path of said actuator, a dog pivoted on said lever and extending into the path of said actuator, and means to limit the movement of said dog on said lever in both directions, said dog having inclined faces meeting at a point and so inclined to each other that, when engaged by the actuator and in the limiting position corresponding to the direction of movement of the carriage, the effective face will have a suitable inclination for camming purposes and the other inclined face will be so positioned as to avoid delay in the return of the lever when the actuator has passed the high point on the dog.

HARRY H. VICKERS.

Witnesses:
　Jennie P. Thorne,
　Edith B. Libbey.